(12) United States Patent
Jakowski et al.

(10) Patent No.: US 10,331,385 B2
(45) Date of Patent: Jun. 25, 2019

(54) COOPERATIVE WRITE-BACK CACHE FLUSHING FOR STORAGE DEVICES

(71) Applicant: Intel Corporation, Santa Clara, CA (US)

(72) Inventors: Andrzej Jakowski, Chandler, AZ (US); Maciej Kaminski, Gdansk (PL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/280,650

(22) Filed: Sep. 29, 2016

(65) Prior Publication Data

US 2018/0089082 A1    Mar. 29, 2018

(51) Int. Cl.

| | |
|---|---|
| *G06F 12/08* | (2016.01) |
| *G06F 3/06* | (2006.01) |
| *G06F 12/02* | (2006.01) |
| *G06F 12/0804* | (2016.01) |
| *G06F 12/0868* | (2016.01) |
| *G06F 12/12* | (2016.01) |

(52) U.S. Cl.
CPC ........ *G06F 3/0685* (2013.01); *G06F 12/0246* (2013.01); *G06F 12/0804* (2013.01); *G06F 12/0868* (2013.01); *G06F 12/12* (2013.01)

(58) Field of Classification Search
CPC ...... G06F 3/061; G06F 3/0655; G06F 3/0679; G06F 12/0808; G06F 3/0685; G06F 12/0246; G06F 12/0804; G06F 12/0868
USPC ........................................................ 711/143
See application file for complete search history.

(56) References Cited

U.S. PATENT DOCUMENTS

| 8,683,142 B2 * | 3/2014 | Harada .................. G06F 12/121 |
| | | 711/143 |
| 2016/0196215 A1 * | 7/2016 | Ogihara .............. G06F 12/0893 |
| | | 711/128 |
| 2016/0378656 A1 * | 12/2016 | Kudo .................. G06F 12/0815 |
| | | 711/143 |

* cited by examiner

*Primary Examiner* — Than Nguyen
(74) *Attorney, Agent, or Firm* — Alliance IP, LLC (57) ABSTRACT

In one embodiment, a request to access a first storage location of a storage device may be received, wherein the storage device comprises a data storage and a cache. The cache may be accessed to obtain data for one or more second storage locations of the storage device, wherein the data for the one or more second storage locations has not been written to the data storage, and wherein the first storage location and the one or more second storage locations are located near each other on the data storage. The data storage may then be accessed in response to the request to access the first storage location of the storage device. The data storage may also be accessed to write the data for the one or more second storage locations obtained from the cache.

20 Claims, 5 Drawing Sheets

COOPERATIVE WRITE-BACK CACHE FLUSHING FOR STORAGE DEVICES

FIELD

The present disclosure relates in general to the field of computer systems, and more specifically, to cache flushing for storage devices.

BACKGROUND

A computer system may include a storage device for storing information associated with the computer system and its resources. For example, the computer system may include a processor, and the processor may execute software that utilizes the storage device, such as an operating system and/or other software applications. The software or applications may request various input and output (I/O) operations involving the storage device, such as reading and writing data on the storage device. In some cases, however, a storage device may be unable to process I/O operations at the same rate that those operations are requested by applications, for example, due to a slow rate at which the storage device can access its primary data storage. Accordingly, some storage devices may include a lower latency cache in addition to their primary data storage mechanism in order to improve latency for processing I/O requests. For example, a storage device may temporarily store data in the cache instead of primary storage, and the storage device may later flush the cache by writing any dirty (e.g., unsynchronized) data from the cache to primary storage. Flushing the cache while application I/O is being processed, however, may negatively impact the performance of the application I/O.

BRIEF DESCRIPTION OF THE DRAWINGS

Like reference numbers and designations in the various drawings indicate like elements.

DETAILED DESCRIPTION

Although the drawings depict particular systems, components, and embodiments, the concepts of various embodiments are applicable to any suitable storage devices, processors, circuits, computer systems, and other devices or components. Examples of devices in which teachings of the present disclosure may be used include desktop computer systems, server computer systems, storage systems, handheld devices, tablets, other thin notebooks, system on a chip (SoC) devices, and embedded components. Some examples of handheld devices include cellular phones, digital cameras, personal digital assistants (PDAs), and handheld PCs. Embedded components may include microcontrollers, application specific integrated circuits (ASIC), digital signal processors (DSP), memory and storage devices, systems on a chip, network computers (NetPC), set-top boxes, network hubs, wide area network (WAN) switches, or any other component that can perform the functions and operations taught below. Various embodiments of the present disclosure may be used in any suitable computing environment, such as a personal computer, a server, a mainframe, a cloud computing service provider infrastructure, a datacenter, a communications service provider infrastructure (e.g., one or more portions of an Evolved Packet Core), or other environment comprising a group of computing devices.

Figure 1:
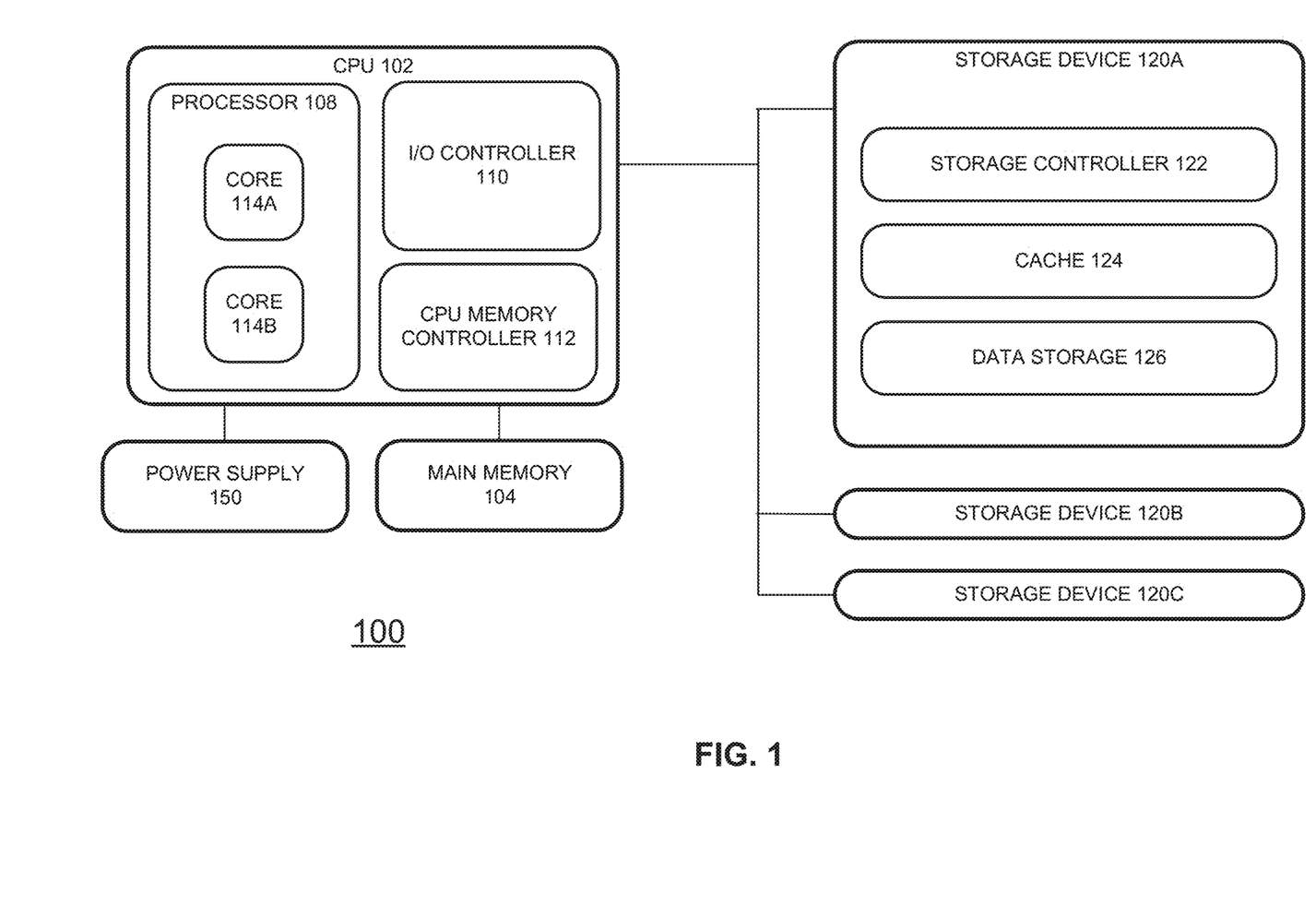
FIG. 1 illustrates a block diagram of a computer system with one or more storage devices in accordance with certain embodiments.

FIG. 1 illustrates a block diagram of a computer system 100 with one or more storage devices 120 in accordance with certain embodiments. In the illustrated embodiment, system 100 includes a central processing unit (CPU) 102 coupled to main memory 104, a plurality of storage devices 120A-C, and a power supply 150 for powering the system and its associated components.

CPU 102 may be used to execute software, such as an operating system and/or other software applications, which may require use of various computing resources of computer system 100. For example, the storage devices 120 of computer system 100 may be used to store data, such as software code and/or user files. During operation, the software executing on CPU 102 may request that data be read from or written to the storage devices 120, and the storage devices 120 may perform the appropriate input and output (I/O) operations in response. In some cases, however, a storage device may be unable to process I/O operations at the same rate that those operations are requested by applications (e.g., due to a slow rate at which the primary data storage may be accessed). Accordingly, in order to improve latency for processing I/O requests, some storage devices 120 may include (or may use) a cache 124 in addition to their primary data storage mechanism 126. The cache 124, for example, may be a form of storage with lower latency (e.g., faster access) but less storage capacity than the primary data storage mechanism 126 of the storage device 120. For example, a hard disk drive may include spinning magnetic disk media as its primary data storage 126, and a faster but smaller memory component as its cache 124 (e.g., lower latency non-volatile or volatile memory). The cache 124 may be implemented internally and/or externally to storage device 120A. A storage device 120 may temporarily store data on the cache 124 rather than primary storage 126 to enable faster processing of I/O operations. For example, for a read operation, a storage device 120 may read the requested data from the cache 124 if it contains that data, otherwise the storage device 120 may read the requested data from primary storage 126 while also caching the data for subsequent access. Similarly, for a write operation, a storage device 120 may temporarily write data to the cache 124 instead of primary storage 126, and the storage device 120 may later flush the cache 124 by writing any dirty (e.g., unsynchronized) data from the cache 124 to primary storage 126. Dirty data, for example, includes data stored in the cache 124 that has not yet been written to primary storage 126. In some cases, a cache 124 used for write operations in this manner may be referred to as a write-back cache.

It is crucial to minimize the amount of dirty data maintained in a write-back cache 124 for various reasons, including, for example, avoiding decreases in performance if the cache 124 is flushed while application I/O is being processed, minimizing recovery and/or rebuild time when the storage device 120 is shutdown with dirty data in the cache 124, and minimizing the amount of time that the primary storage 126 is out-of-sync with the temporary copy of data residing in cache 124 (e.g., in the event of a system failure). Accordingly, a storage device 120 may flush the cache 124 in various scenarios, such as when the cache 124 is idle (e.g., no application I/O is being processed), when there is a cache eviction event (e.g., a dirty cache entry is evicted or replaced by a new cache entry), and/or in response to a user request (e.g., forced cache flushing, system shutdowns). Some storage devices, however, may refrain from flushing the cache while application I/O is being processed, to avoid any negative performance impact on the I/O processing. For example, some storage devices may avoid flushing dirty data for a cache eviction event if application I/O is currently being processed for a cache miss, due to the negative performance impact observed by the application that requested the I/O. For example, for systems that use disk-based storage devices with spinning media (e.g., hard disk drives), the spinning media is often the slowest component, and performance degradations may result from the costly head seek operations required to simultaneously process application I/O and flush the cache.

As described throughout this disclosure, cooperative write-back cache flushing functionality may be used to enable storage devices 120 to efficiently perform cache flushing while simultaneously processing application I/O. Cooperative cache flushing may be used, for example, to schedule cache flushing operations with application I/O operations that all require access to nearby locations on the primary data storage 126 of the storage device 120. For example, for a hard disk drive, the disks or platters used to store data may be organized into cylinders, tracks, and sectors, and the hard disk drive may include one or more heads to read and write data on the disks or platters. In order to read or write data, however, a head of the hard disk drive may first need to seek to the appropriate location on the particular disk or platter (e.g., seek to the appropriate cylinder of a disk), thus increasing the amount of time required to perform a read or write operation. Accordingly, a hard disk drive may use cooperative cache flushing to schedule cache flushing operations with application I/O operations that involve access to nearby storage locations on a disk or platter (e.g., consecutive or adjacent sectors of the same head/cylinder of a disk). Thus, cooperative cache flushing for a hard disk drive may reduce the number of head seek operations required to simultaneously flush the cache 124 and process application I/O, which may avoid performance disruptions to the application I/O.

The cooperative write-back cache flushing functionality described throughout this specification provides numerous technical advantages, including efficiently flushing dirty cache data without compromising the processing rate for application I/O. For example, for hard disk drives, cooperative cache flushing maximizes performance by minimizing disk head seek operations. Accordingly, cooperative cache flushing increases the overall I/O processing rate of storage devices 120. For example, in some embodiments, the application I/O processing rate for storage devices 120 with cooperative cache flushing may be double that of existing storage devices without cooperative cache flushing. Cooperative cache flushing may be particularly beneficial for active storage devices 120 that process large volumes of I/O operations. Moreover, cooperative cache flushing enables more frequent cache flushing (without decreasing performance), which increases the level of synchronization between the primary storage 126 and the cache 124, and thus ultimately improves reliability (e.g., in the event of a system failure).

The cooperative write-back cache flushing functionality described throughout this specification may be implemented, for example, in a system such as computer system 100 of FIG. 1 (e.g., by storage devices 120 of computer system 100). In the illustrated embodiment, computer system 100 includes CPU 102, main memory 104, storage devices 120A-C, and power supply 150, as described below.

CPU 102 comprises a processor 108, such as a microprocessor, an embedded processor, a digital signal processor (DSP), a network processor, a handheld processor, an application processor, a co-processor, a system on a chip (SoC), or other device to execute code (i.e., software instructions). Processor 108, in the illustrated embodiment, includes two processing elements (cores 114A and 114B in the illustrated embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 114 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet, a core and a hardware thread are often viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 110 is a controller that includes logic to facilitate communication between CPU 102 and I/O devices, such as storage devices 120. I/O controller 110 may be, for example, an internal I/O controller integrated with CPU 102, an external I/O controller separate from CPU 102, and/or a combination of internal and external I/O controllers. I/O controller 110 may interact with any I/O device capable of transferring data to, and/or receiving data from, an electronic system such as CPU 102. I/O devices may include, for example, data storage devices (e.g., storage devices 120), wireless transceivers, network interfaces, network processors, audio/video (A/V) devices, monitors, mice, keyboards, printers, scanners, and/or any other suitable input or output device. In the illustrated embodiment, I/O controller 110 may facilitate communication between CPU 102 and storage devices 120. For example, CPU 102 may use I/O controller 110 to read data from a storage device 120 or write data to a storage device 120 (e.g., by issuing commands to read and write data at particular addresses or locations on the storage device 120).

An I/O device may communicate with the I/O controller 110 of the CPU 102 using any suitable interface, bus, and/or signaling protocol, such as M.2 interfaces (e.g., a computer expansion card interface with a flexible physical specification that supports: different module widths/lengths, logical interfaces such as AHCI and NVMe, and computer expansion buses such as PCI Express 3.0, Serial ATA 3.0, and USB 3.0), peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, logical device interface specifications such as Non-Volatile Memory Express (NVMe) (e.g., as described by specification(s) available at www.nvmexpress.org/specifications/) or the Advanced Host Controller Interface (AHCI) (e.g., the Serial ATA AHCI Specification, Rev. 1.3.1 available at http://www.intel.com/content/www/us/en/io/serial-ata/serial-ata-ahci-spec-rev1-3-1.html), or any other current or future interface or signaling protocol. In various embodiments, I/O devices coupled to the I/O controller 110 may be located off-chip (i.e., not on the same chip as CPU 102) or may be integrated on the same chip as the CPU 102.

CPU memory controller 112 may be a controller that includes logic for managing the flow of data going to and from main memory 104 of computing system 100. Main memory 104 may include any of a wide variety of memories, including but not limited to, random access memory (RAM) (e.g., dynamic random access memory (DRAM), synchronous dynamic random access memory (SDRAM), static random access memory (SRAM)), read only memory (ROM), logic blocks of a field programmable gate array (FPGA), erasable programmable read only memory (EPROM), electrically erasable programmable ROM (EEPROM), and/or any suitable combination of the foregoing. CPU memory controller 112 may include logic to read from main memory 104, write to main memory 104, and/or request other operations for main memory 104. In some embodiments, CPU memory controller 112 may be implemented on the same chip as CPU 102, whereas in other embodiments, CPU memory controller 112 may be implemented on a separate chip from CPU 102.

Power supply 150 may include any component and/or mechanism for powering system 100 and/or its associated components, including alternating current (AC) power sources (e.g., electrical outlets) and direct current (DC) power sources (e.g., batteries). Power supply 150 may be coupled, directly or indirectly, to CPU 102, storage devices 120, and/or any other component of system 100.

Storage devices 120A-C may include any suitable devices for storing data. For example, in some embodiments, a storage device 120 may be a device with non-volatile storage (magnetic disks) for persistently storing data, such as a hard disk drive. Storage devices 120 may be used, for example, to store data associated with files and programs of computer system 100 (e.g., user files, code for software applications). In some embodiments, a storage device 120 may be dedicated to a particular CPU 102 and/or shared with other CPUs or devices.

Storage devices 120 may include any type or combination of non-volatile and/or volatile storage. Non-volatile storage is a storage medium that retains data even without power. Non-limiting examples of non-volatile storage may include any or a combination of: disk-based storage mediums (e.g., magnetic and/or optical storage mediums); solid-state storage (e.g., any form of persistent flash memory, including planar or three dimensional (3D) NAND flash memory or NOR flash memory), 3D crosspoint memory, storage devices that use chalcogenide phase change material (e.g., chalcogenide glass), byte addressable non-volatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), and/or various other types of non-volatile random access memories (RAM). In particular embodiments, a storage device 120 with non-volatile storage may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org). Storage devices 120 may also include any type or combination of volatile storage. Volatile storage is a storage medium that requires power to retain data. Examples of volatile storage may include various types of random access memory (RAM), such as dynamic random access memory (DRAM), synchronous dynamic random access memory (SDRAM), and static random access memory (SRAM). In particular embodiments, storage devices 120 with DRAM may comply with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as Double Data Rate (DDR) based standards, and communication interfaces of storage devices 120 that implement such standards may be referred to as DDR-based interfaces.

Storage devices 120 may comprise any suitable type of storage and are not limited to any particular storage technology, speed, and/or form factor. Moreover, computer system 100 may include multiple different types of storage devices 120. For example, in some embodiments, computer system 100 may include tiered storage, such as a first tier of solid-state drives and a second tier of hard disk drives. Storage devices 120 may communicate with I/O controller 110 using any suitable communication protocol, such as a DDR-based protocol, PCI, PCIe, USB, SAS, SATA, FC, System Management Bus (SMBus), or other suitable protocol. Storage devices 120 may also include a communication interface (e.g., a SATA or M.2 interface) to communicate with I/O controller 110 in accordance with any suitable logical device interface specification, such as NVMe, AHCI, or any other suitable specification. In particular embodiments, storage device 120 may comprise multiple communication interfaces that each communicate with I/O controller 110 using different protocols.

In the illustrated embodiment, storage device 120A includes storage controller 122, cache 124, and data storage 126. Cache 124 and data storage 126 may include any component or mechanism capable of storing data, including any type or combination of non-volatile and/or volatile storage, such as those described above. For example, in some embodiments, data storage 126 may include magnetic and/or optical storage mediums, such as the disks or platters of a hard disk drive. In addition, in some embodiments, cache 124 may include a form of non-volatile memory, such as flash-based memory or 3D crosspoint memory, or a form of volatile memory, such as dynamic random access memory (DRAM) or any other type of random access memory (RAM). In some embodiments, storage device 120A may use data storage 126 as its primary data storage, and storage device 120A may use cache 126 as temporary data storage to enable faster processing of I/O operations. In addition, although the illustrated embodiment includes cache 124 as part of storage device 120A, other embodiments may implement cache 124 using memory or storage that is external to storage device 120A (e.g., main memory 104, a solid-state drive (SSD) separate from storage device 120A, and/or any other memory or storage component that is separate from storage device 120A). In such embodiments, the cooperate write-back cache flushing functionality described throughout this disclosure may be implemented, for example, by an operating system executing on CPU 102 and/or by the storage controller 122.

Storage controller 122 may include logic to receive requests from CPU 102 (e.g., via I/O controller 110), cause the requests to be carried out with respect to data storage 126, and provide data associated with the requests to CPU 102 (e.g., via I/O controller 110). Storage controller 122 may be implemented on the same chip, board, or device as data storage 126, or on a different chip, board, or device. For example, in some embodiments, storage controller 122 may be a centralized controller that manages storage operations for multiple different storage devices 120 and/or data storages 126 (which may be of the same type or of different types). In some embodiments, storage controller 122 may implement the cooperative write-back cache flushing functionality described throughout this disclosure.

In some embodiments, all or some of the elements of system 100 may be resident on (or coupled to) the same circuit board (e.g., a motherboard). In various embodiments, any suitable partitioning between the elements may exist. For example, the illustrated elements of CPU 102 may be located on a single die or package (i.e., on-chip) or any of the elements of CPU 102 may be located off-chip. Similarly, the illustrated elements of storage device 120A may be located on a single chip or on multiple chips. In various embodiments, a storage device 120 and its computing host (e.g., CPU 102) may be located on the same circuit board or on the same device, while in other embodiments the storage device 120 and the computing host may be located on different circuit boards or devices.

The components of system 100 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem may include point-to-point multiplexing logic between various components of system 100, such as cores 114, one or more CPU memory controllers 112, I/O controller 110, I/O devices, direct memory access (DMA) logic (not shown), etc. In various embodiments, components of computer system 100 may be coupled together through one or more networks comprising any number of intervening network nodes, such as routers, switches, or other computing devices. For example, a computing host (e.g., CPU 102) and storage devices 120 may be communicatively coupled through a network. Although not depicted in the illustrated embodiment, system 100 may include additional components or I/O devices, such as a display to output data for CPU 102, a network interface to communicate over a network, and/or any other peripherals, interfaces, or components. In some embodiments, for example, these components may be communicatively coupled to CPU 102.

Figure 2:
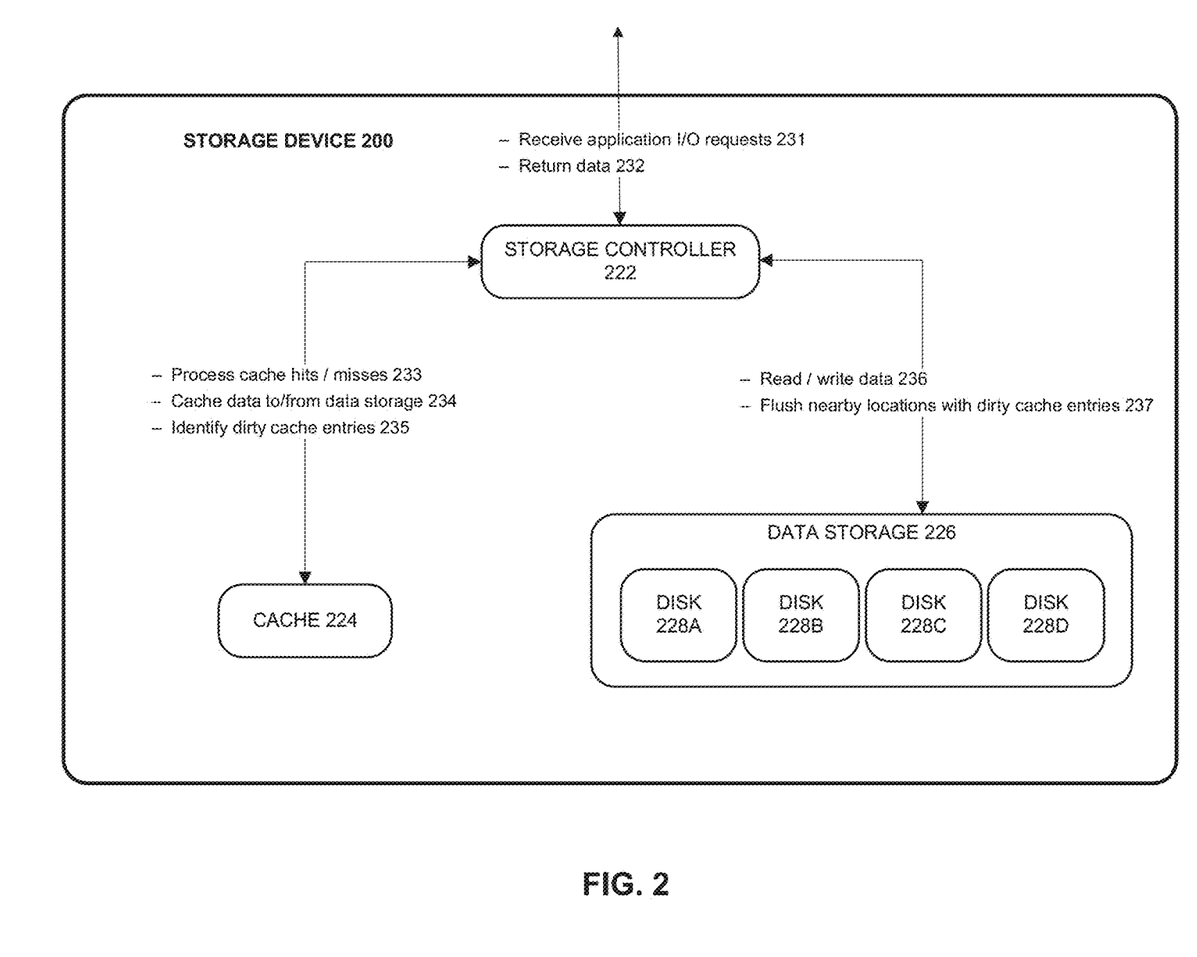
FIG. 2 illustrates an example embodiment of a storage device with cooperative write-back cache flushing.

FIG. 2 illustrates an example embodiment of a storage device 200 with cooperative write-back cache flushing. Storage device 200 may be, for example, a hard disk drive. In some embodiments, storage device 200 may be used to implement storage devices 120 of FIG. 1.

In the illustrated embodiment, storage device 200 includes storage controller 222, cache 224, and data storage 226. Storage controller 226 may be a combination of hardware and/or software logic used to control the operation of storage device 200. For example, in some embodiments, storage controller 222 may be implemented using an application specific integrated circuit (ASIC), other circuitry, and/or firmware. Storage controller 222 may process input and output (I/O) requests, such as read and write operations, received from applications on a host computing system of the storage device 200 (e.g., computer system 100 of FIG. 1). In addition, as described below, storage controller 222 may implement cooperative write-back cache flushing functionality.

Data storage 226 may be a component or mechanism used to provide persistent storage of data. In the illustrated embodiment, data storage 226 is a disk-based storage containing a plurality of disks 228A-D. Disks 228 may include, for example, any type of magnetic, optical, or other disk-based storage mediums capable of storing data. In some embodiments, for example, data storage 226 may be the storage used by a hard disk drive with spinning media, and disks 228 may be the disks or platters of the hard disk drive.

Cache 224 may include any component or mechanism capable of storing data, including any type or combination of non-volatile and/or volatile storage. For example, in some embodiments, cache 224 may include a form of non-volatile memory, such as flash-based memory or 3D crosspoint memory, or a form of volatile memory, such as dynamic random access memory (DRAM) or any other type of random access memory (RAM). In addition, although the illustrated embodiment includes cache 224 as part of storage device 200, other embodiments may implement cache 224 using memory or storage that is external to storage device 200 (e.g., main memory of the host computing device, a separate solid-state drive (SSD), and/or any other memory or storage component that is separate from storage device 200). In such embodiments, cooperative cache flushing may be implemented, for example, by an operating system of the host computing system and/or by storage controller 222.

In some embodiments, storage device 200 may use data storage 226 as its primary data storage, and storage device 200 may use cache 226 as temporary data storage to enable faster processing of I/O operations. For example, in some cases, a storage device may be unable to process I/O operations at the same rate that those operations are requested by applications, due to a slow rate at which the storage device can access its primary data storage. Accordingly, in order to improve latency for processing I/O requests, storage device 200 may include a cache 224 in addition to its primary data storage 226. The cache 224, for example, may be a form of storage with lower latency (e.g., faster access) but less storage capacity than the primary data storage 226. For example, a hard disk drive may include spinning disk media as its primary data storage 226, and a faster but smaller memory component as its cache 224 (e.g., lower latency non-volatile or volatile memory). Storage device 200 may temporarily store data on cache 224 rather than on primary storage 226 to enable faster processing of I/O operations, and then may later flush the data to primary storage 226. For example, for a read operation, storage device 200 may read the requested data from cache 224 if the cache contains that data, otherwise storage device 200 may read the requested data from primary storage 226 while also caching the data for subsequent I/O involving that data. Similarly, for a write operation, storage device 200 may temporarily write data to cache 224 instead of primary storage 226, and storage device 200 may later flush cache 224 by writing any dirty (e.g., unsynchronized) data from the cache 224 to primary storage 226. In some cases, a cache 224 used for write operations in this manner may be referred to as a write-back cache.

As shown in the illustrated example, storage controller 222 receives I/O requests from applications on its host computing system (depicted by label 231). For example, applications on a host computing system may request that data be read from or written to storage device 200.

In response to a write request, storage controller 222 may communicate with cache 224 to determine whether there is already a cache entry for the specified storage location or storage address. If the cache 224 does not already contain an entry for the specified storage location, a new entry may be created in the cache 224. Storage controller 222 may then write the data to the cache 224 (depicted by label 234). Because the cache 224 now contains data for the specified storage location that has not yet been written to the primary data storage 226, the cache 224 and the primary storage 226 are unsynchronized with respect to that storage location. Accordingly, the cache entry for that storage location may be designated as "dirty" to indicate that the data in that cache entry still needs to be written (or flushed) to the primary storage 226.

In response to a read request, storage controller 222 may communicate with cache 224 to determine whether there is a cache hit or cache miss for the requested storage location or storage address (depicted by label 233). For example, a cache hit may result if the cache 224 contains data for the requested storage location, and a cache miss may result if the cache 224 does not contain the data for the requested storage location. If there is a cache hit, storage controller 222 may then read the requested data from the cache 224 and return the data to the requesting application (depicted by label 232). If there is a cache miss, storage controller 222 may read the requested data from data storage 226 (depicted by label 236) and then return the data to the requesting application (depicted by label 232). In addition, storage controller 222 may cache the data read from data storage 226 (depicted by label 234) to enable faster processing of subsequent I/O requests involving that data. For example, storage controller 222 may create a new cache entry in cache 224 and may write the data to the new cache entry.

In some embodiments, if the cache 224 is already full when a new cache entry needs to be created, storage controller 222 may need to evict an existing cache entry before the new cache entry can be created. If an existing cache entry is designated as dirty, however, that cache entry may need to be flushed to ensure that the dirty data is written to primary storage 226.

Cooperative cache flushing may be used to flush certain cache entries when storage controller 222 reads or writes data on primary data storage 226. For example, as described above, data may be read from a storage location on primary storage 226 in response to a cache miss. In addition, data may be written to a storage location on primary storage 226 in response to a cache eviction. With cooperative cache flushing, when accessing a particular storage location on data storage 226 (e.g., in response to a cache miss), storage controller 222 may also flush dirty cache entries that contain data for other nearby storage locations on data storage 226 (depicted by label 237). Thus, cooperative cache flushing may enable cache flushing operations to be scheduled with application I/O operations that involve nearby locations on the primary data storage 226. For example, if one or more dirty cache entries contain data for storage locations on primary data storage 226 that are near other storage locations that need to be accessed for application I/O, the dirty cache entries may be flushed when the application I/O is performed. For example, for a hard disk drive, when a particular storage location of a disk 228 is accessed for application I/O, dirty cache entries may be flushed for nearby storage locations on the disk 228 (e.g., consecutive or adjacent sectors for the same head and cylinder of the disk). In this manner, cooperative cache flushing may enable storage device 200 to efficiently flush the cache 224 while simultaneously processing application I/O.

Figure 3:
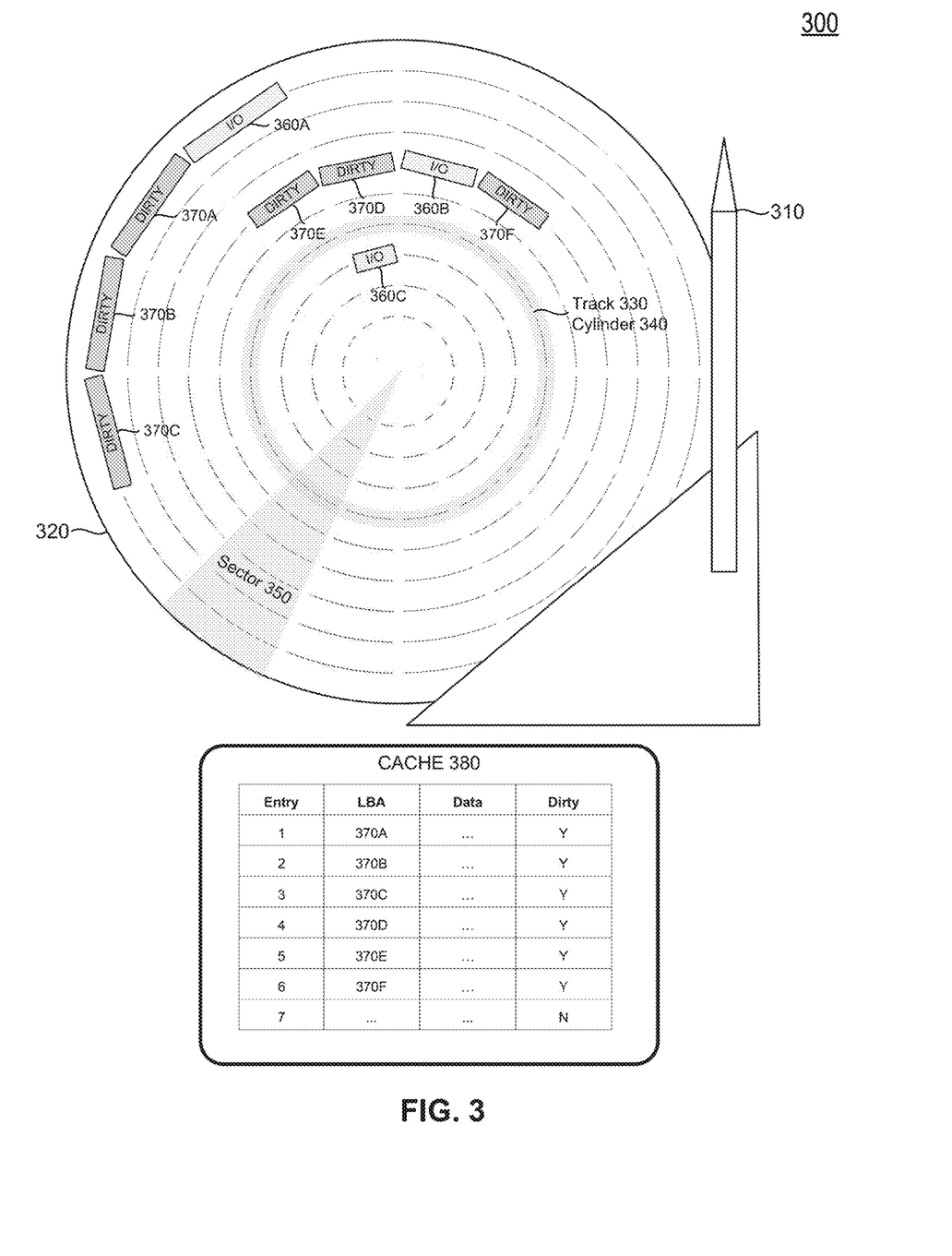
FIG. 3 illustrates an example use case of cooperative write-back cache flushing for a disk-based storage device.

FIG. 3 illustrates an example use case of cooperative write-back cache flushing for a disk-based storage device 300.

In the illustrated embodiment, disk-based storage device 300 includes a single disk (or platter) 320. However, in other embodiments, any number of disks (or platters) 320 may be used in disk-based storage device 300. Disk 320 may include, for example, any type of magnetic, optical, or other disk-based storage medium capable of storing data. In some embodiments, for example, disk-based storage device 300 may be a hard disk drive with spinning disk 320 media, and disk 320 may be a disk or platter of the hard disk drive. In addition, disk-based storage device 300 includes a cache 380. Cache 380 may include any component or mechanism capable of storing data, including any type or combination of non-volatile and/or volatile storage. For example, in some embodiments, cache 380 may include a form of non-volatile memory, such as flash-based memory or 3D crosspoint memory, or a form of volatile memory, such as dynamic random access memory (DRAM) or any other type of random access memory (RAM). In some embodiments, storage device 300 may use disk-based storage 320 as its primary data storage, and storage device 300 may use cache 380 as temporary data storage to enable faster processing of I/O operations. In addition, although the illustrated embodiment includes cache 380 as part of storage device 300, other embodiments may implement cache 380 using memory or storage that is external to storage device 300 (e.g., main memory of the host computing device, a separate solid-state drive (SSD), and/or any other memory or storage component that is separate from storage device 300). In such embodiments, cooperative cache flushing may be implemented, for example, by an operating system of the host computing system and/or by a storage controller of storage device 300.

In the illustrated embodiment, storage device 300 also includes head 310. Head 310 may be a device in a hard disk drive that reads and writes data by manipulating the magnetic surface of an associated disk platter 320. A disk or platter 320 has two sides, and thus two surfaces on which data can be manipulated. Accordingly, a hard disk drive typically includes two heads 310 per disk or platter 320 (e.g., a head 310 for each side of the disk or platter 320). Thus, while the illustrated embodiment only includes a single head 310 and single disk 320 for simplicity, other embodiments may include two heads 310 per disk or platter 320 and any number of disks or platters 320.

The disks 320 of a hard disk drive are organized into heads 310, cylinders 340, tracks 330, and sectors 350. In some embodiments, a particular storage location on a disk 320 may be referenced by identifying the associated cylinder, head, and sector. This may be referred to as cylinder-head-sector (CHS) addressing, which is a method of addressing each physical block or storage location on a hard disk drive. For example, because there is a head 310 for each side of a disk in a hard disk drive, the heads 310 can be referenced to identify a particular side of a particular disk 320. Tracks 330 each correspond to a particular circular strip on the surface of a disk 320, and there are multiple tracks 330 on each side of a disk 320. Cylinders 340 each correspond to a collection of tracks 330 that are in the same location on each disk 320 surface. Finally, tracks 330 are further divided into segments called sectors 350. Individual sectors of a hard disk drive can be referenced using the cylinder-head-sector (CHS) addressing scheme.

However, because CHS addressing is based on the geometry of the disks in disk-based storage devices, CHS addressing does not map well to other types of storage devices. Accordingly, logical block addressing (LBA) is a more generic addressing scheme that translates to any type of storage device 300. Logical block addressing (LBA) is a simple linear addressing scheme that addresses each physical block or storage location on a storage device using an integer index. For example, the first block may be addressed as LBA 0, the second block may be addressed as LBA 1, the third block may be addressed as LBA 2, and so forth. Many storage devices use LBA addressing, including hard disk drives, due to its flexible applicability to any type of storage device. However, a hard disk drive may still need to map a logical block address (LBA) to the appropriate cylinder-head-sector (CHS) address in order to access the appropriate physical storage location on a disk or platter 320. For example, for a hard disk drive, LBA addressing may use integer indexes to identify the sectors and storage blocks of a disk 320. The LBA indexing begins with the first cylinder and first head of the storage device 300 (e.g., the outermost cylinder on the first side of the first disk 320), which forms a track 330 corresponding to that particular cylinder-head combination. The sectors 350 on that track 330 are then numbered consecutively with LBA indexes. Once that track 330 is exhausted, the LBA numbering continues to the second head, while staying on the first cylinder. Once all heads on the first cylinder are exhausted, the LBA numbering continues to the second cylinder in the same manner, until all remaining cylinders are exhausted. Accordingly, lower LBA addresses map to the outer cylinders of the disks or platters 320, while higher LBA addresses map to the inner cylinders.

In the illustrated example, cooperative cache flushing may be used to flush certain cache entries when reading or writing data to disk 320. In the illustrated embodiment, storage locations 360A-C need to be accessed to perform application I/O. In addition, storage locations 370A-F are unsynchronized with the cache 380, meaning the cache 380 contains dirty data for those storage locations that has not yet been written to disk 320. Without cooperative cache flushing, the dirty cache entries for storage locations 370A-F would be flushed independently of the application I/O for storage locations 360A-C. Cooperative cache flushing, however, may be used to flush the cache entries for storage locations 370A-F when performing application I/O for storage locations 360A-C, without any additional disk head seeking.

For example, when head 310 accesses storage location 360A to perform application I/O, the adjacent storage locations 370A-C may also be accessed to flush the dirty cache data for those storage locations. Similarly, when head 310 accesses storage location 360B to perform application I/O, the adjacent storage locations 370D-F may also be accessed to flush the dirty cache entries for those storage locations. In addition, head 310 may subsequently access storage location 360C to perform application I/O. However, because there are no storage locations near or adjacent to storage location 360C that have dirty data in the cache, no additional flushing may be performed when accessing storage location 360C.

Figure 4:
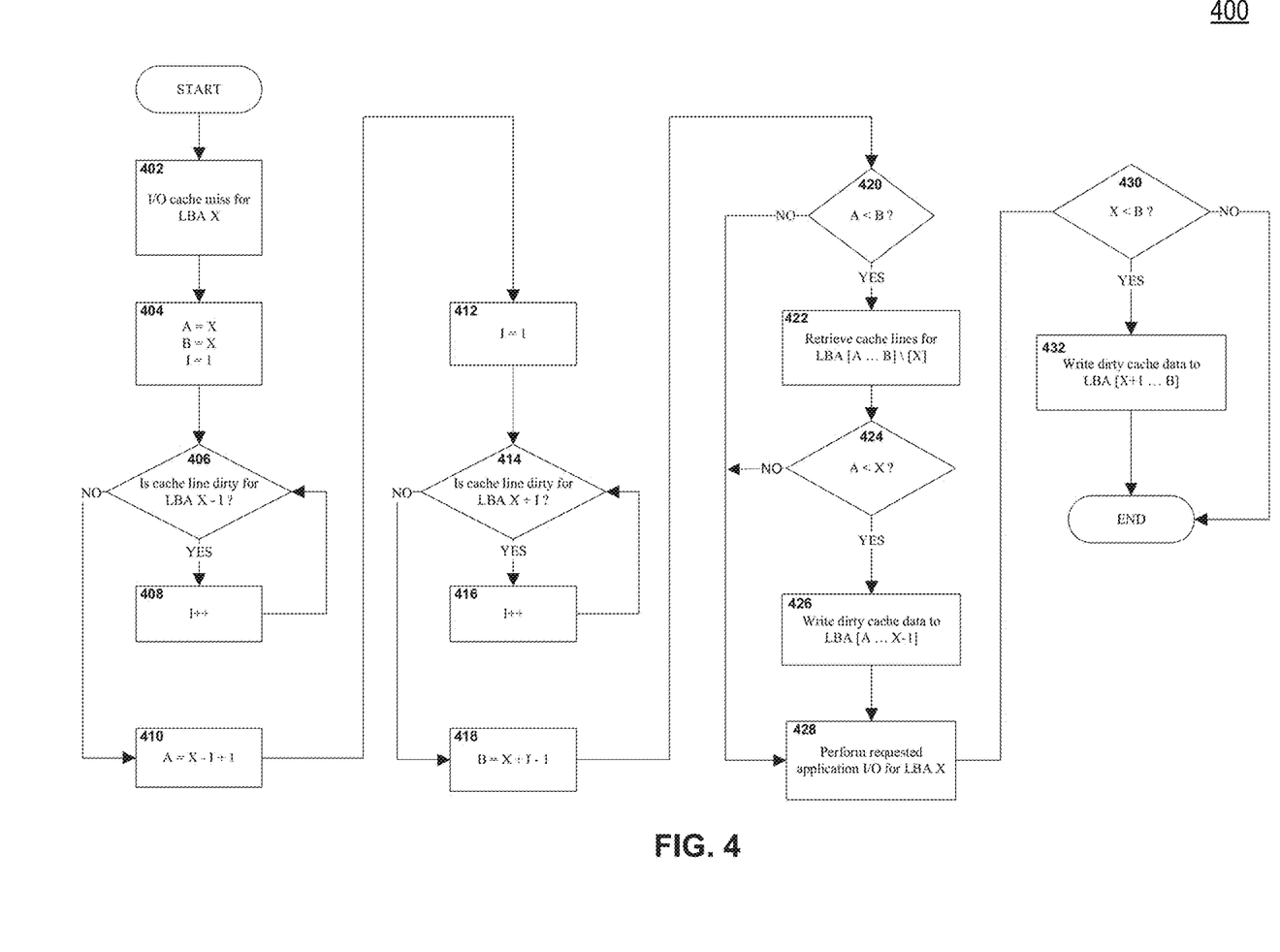
FIG. 4 illustrates a flow diagram for an example embodiment of cooperative write-back cache flushing for a disk-based storage device.

FIG. 4 illustrates a flow diagram 400 for an example embodiment of cooperative write-back cache flushing for a disk-based storage device. The flow diagram 400 depicts example operations that may be performed by any suitable logic and/or components, including the components described throughout this disclosure (e.g., storage devices 120 of FIG. 1, storage device 200 of FIG. 2, and/or storage device 300 of FIG. 3).

The flow diagram may begin at 402 where application I/O for a particular logical block address (denoted as LBA X) results in a cache miss. For example, in some embodiments, the storage locations or blocks on a storage device may be addressed using logical block addressing (LBA), which is a linear addressing scheme that identifies each physical block or storage location using an integer index, such as LBA 0 for the first block, LBA 1 for the second block, LBA 2 for the third block, and so forth. Thus, in response to a read operation requested by an application for logical block address X, the storage device may first check the cache for the corresponding data. If the cache does not contain the data for logical block address X, then the result is a cache miss and the data may need to be retrieved from primary storage.

The flow diagram may then proceed to 404, where variables A, B, and I are initialized. Variables A and B are both initialized to the value of X (i.e., the requested logical block number), and variable I is initialized to 1. Throughout the flow diagram, variable A is used to identify dirty logical blocks that immediately precede logical block address X; variable B is used to identify dirty logical blocks that immediately follow logical block address X; and variable I is used as a counter to iterate through the logical blocks that are adjacent to logical block address X.

The flow diagram may proceed to 406 to determine whether the cache line is dirty for logical block address X−I, which is the logical block that precedes logical block address X by I blocks. If it is determined at 406 that the cache line is dirty for logical block address X−I, the flow diagram may then proceed to 408 to increment the value of I by 1, and may then return to 406 to again determine whether the cache line is dirty for logical block address X−I. Thus, at 406 and 408, the flow diagram begins with the logical block address that immediately precedes logical block address X (i.e., X−1), and then cycles through each consecutively preceding logical block until identifying the first preceding logical block that does NOT have a dirty cache entry. Thus, once it is determined at 406 that the cache line for logical block address X−I is NOT dirty, then all consecutively preceding dirty logical blocks have been identified. The flow diagram may then proceed to 410 to assign variable A with a value equal to X−I+1, which corresponds to the logical block address for the last consecutively preceding dirty logical block.

The flow diagram may then proceed to 412 where variable I is reset to a value of 1 in order to similarly cycle through the logical blocks that immediately follow logical block address X. Thus, the flow diagram may proceed to 414 to determine whether the cache line is dirty for logical block address X+I, which is the logical block that follows logical block X by I blocks. If it is determined at 414 that the cache line is dirty for logical block address X+I, the flow diagram may then proceed to 416 to increment the value of I by 1, and may then return to 414 to again determine whether the cache line is dirty for logical block address X+I. Thus, at 414 and 416, the flow diagram begins with the logical block address that immediately follows logical block address X (i.e., X+1), and then cycles through each consecutive logical block until identifying the first logical block that does NOT have a dirty cache entry. Thus, once it is determined at 414 that the cache line for logical block address X+I is NOT dirty, then all consecutive dirty logical blocks that follow logical block address X have been identified. The flow diagram may then proceed to 418 to assign variable B with a value equal to X+I−1, which corresponds to the logical block address for the last consecutive dirty logical block that follows logical block X.

The flow diagram may then proceed to 420 to determine whether the value of variable A is less than the value of variable B. For example, if the value of A is NOT less than the value of B (e.g., if A=B), then no dirty logical blocks adjacent to logical block address X were identified. Thus, if it is determined at 420 that the value of A is NOT less than the value of B, the flow diagram may then proceed to 428 to perform the requested application I/O for logical block address X, as discussed further below. However, if the value of A is less than the value of B, then at least one dirty logical block adjacent to logical block address X was identified. Thus, the flow diagram may proceed to 422 to retrieve the cache lines corresponding to logical block addresses A through B, excluding logical block address X (denoted in the figure as LBA [A . . . B]\[X]), which are the cache lines containing dirty data for the logical blocks adjacent to logical block address X.

The flow diagram may then proceed to 424 to determine whether the value of variable A is less than the value of X. For example, if the value of A is NOT less than X, then no dirty logical blocks were identified that immediately precede logical block address X, and the flow diagram may then proceed to 428 to perform the requested application I/O for logical block address X, as discussed further below. However, if the value of A is less than X, then at least one dirty logical block was identified that immediately precedes logical block address X. Thus, the flow diagram may proceed to 426 to write the dirty cache data to logical block addresses A through X−1 (denoted in the figure as LBA [A . . . X−1]).

The flow diagram may then proceed to 428 to perform the requested application I/O for logical block address X. For example, if an application requested a read operation for logical block address X, then the data stored at logical block address X may be read from the storage device.

The flow diagram may then proceed to 430 to determine whether the value of variable X is less than the value of B. For example, if the value of X is NOT less than B, then no dirty logical blocks were identified that immediately follow logical block address X, and the flow diagram may then be complete. However, if the value of X is less than B, then at least one dirty logical block was identified that immediately follows logical block address X. Thus, the flow diagram may then proceed to 432 to write the dirty cache data to logical block addresses X+1 through B (denoted in the figure as LBA [X+1 B]).

At this point, the flow diagram may be complete. In some embodiments, however, the flow diagram may restart and/or certain blocks may be repeated. For example, in some embodiments, the flow diagram may restart at 402 to continue receiving and processing I/O for a storage device.

The flow diagram described in FIG. 4 is merely representative of operations that may occur in particular embodiments. In other embodiments, additional operations may be performed and/or certain operations may be omitted. Various embodiments of the present disclosure contemplate any suitable mechanisms for accomplishing the functions described herein. Some of the operations illustrated in the flow diagram of FIG. 4 may be repeated, combined, modified, and/or deleted where appropriate. Additionally, operations may be performed in any suitable order without departing from the scope of particular embodiments.

Figure 5:
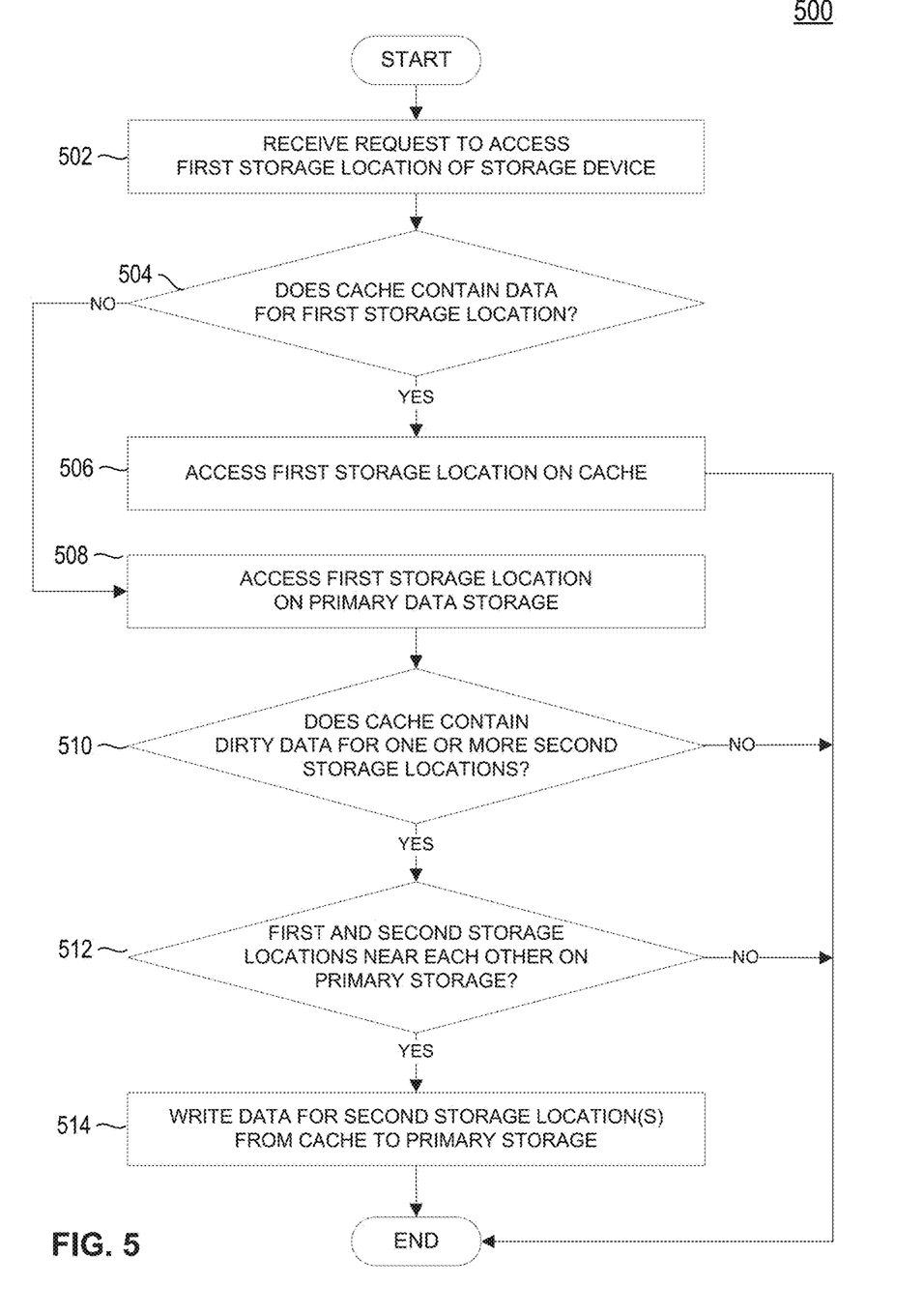
FIG. 5 illustrates a flow diagram for an example embodiment of cooperative write-back cache flushing for a storage device.

FIG. 5 illustrates a flow diagram 500 for an example embodiment of cooperative write-back cache flushing for a storage device. The flow diagram 500 depicts example operations that may be performed by any suitable logic and/or components, including the components described throughout this disclosure (e.g., storage devices 120 of FIG. 1, storage device 200 of FIG. 2, and/or storage device 300 of FIG. 3).

The flow diagram may begin at block 502 by receiving a request to access a first storage location of a storage device. In some embodiments, for example, the storage device may include a primary data storage and a cache. For example, the storage device may use the primary data storage for persistent storage of data, and it may use the cache for temporary storage of data to enable faster processing of I/O operations. The cache may be implemented internally and/or externally to the storage device.

The flow diagram may then proceed to block 504 to determine whether the cache contains data for the first storage location. If it is determined at block 504 that the cache does contain data for the first storage location, the flow diagram may then proceed to block 506 to access the cache to retrieve the data for the first storage location. For example, for a read request, data for the first storage location may be read from the cache and then returned to the requesting application. At this point, the flow diagram may be complete for the current request.

If it is determined at block 504 that the cache does NOT contain data for the first storage location, the flow diagram may then proceed to block 508 to access the first storage location on primary data storage. The flow diagram may then proceed to block 510 to determine whether the cache contains dirty data for one or more second storage locations. For example, the cache may contain dirty data if the cached data for a particular storage location has not yet been written to primary storage.

If it is determined at block 510 that the cache does contain dirty data for one or more second storage locations, the flow diagram may then proceed to block 512 to determine whether the first and second storage locations are near each other on primary storage. For example, the first and second storage locations may be near each other if they are consecutive and/or adjacent storage locations on the primary storage (e.g., consecutive or adjacent sectors on the same head and cylinder of a hard disk drive). For example, for a hard disk drive, it may be determined whether a plurality of logical block addresses for the first and second storage locations correspond to adjacent physical locations on the data storage.

If it is determined at block 510 that the cache does NOT contain dirty data for one or more second storage locations, or if it is determined at block 512 that the first and second storage locations are NOT near each other on primary storage, then the flow diagram may be complete for the current request, as there are no dirty cache entries to flush for nearby storage locations.

If it is determined at block 512 that the first and second storage locations are near each other on primary storage, the flow diagram may then proceed to block 514 to flush the dirty cache entries by writing data for the one or more second storage locations from the cache to primary storage.

At this point, the flow diagram may be complete. In some embodiments, however, the flow diagram may restart and/or certain blocks may be repeated. For example, in some embodiments, the flow diagram may restart at block 502 to continue receiving and processing requests to access a storage device.

The flow diagram described in FIG. 5 is merely representative of operations that may occur in particular embodiments. In other embodiments, additional operations may be performed and/or certain operations may be omitted. Various embodiments of the present specification contemplate any suitable mechanisms for accomplishing the functions described herein. Some of the operations illustrated in the flow diagram of FIG. 5 may be repeated, combined, modified, and/or deleted where appropriate. Additionally, operations may be performed in any suitable order without departing from the scope of particular embodiments.

The functionality described throughout this specification may be represented or implemented in various forms. For example, the design of a product or component may go through various stages (e.g., from creation to simulation to fabrication) and may be represented in various forms. First, as is useful in simulations, hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software-based models of hardware, and HDL and other functional description language objects, can include register transfer language (RTL) files, among other examples. Such objects can be machine-parsable, such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of systems on a chip (SoC) and other hardware devices. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the associated data used to represent the design may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques described by the present specification.

As used herein, a module, component, controller, device, and/or engine may refer to any combination of hardware, software, firmware, and/or other logic. As an example, a module may include hardware (e.g., a microcontroller or application specific integrated circuit (ASIC)) associated with a non-transitory medium to store code adapted to be executed by the hardware. Therefore, in some embodiments, modules and the other terms identified above may refer to hardware that is specifically configured to recognize and/or execute code held on a non-transitory medium. Furthermore, in other embodiments, modules and the other terms identified above may refer to the non-transitory medium and associated code that is specifically adapted to be executed by the hardware to perform certain operations. In addition, modules and the other terms identified above may refer to a combination of hardware (e.g., a microcontroller or ASIC), non-transitory mediums, and code. The boundaries of modules (and the other terms identified above) often vary and potentially overlap, even though they may be illustrated as being separate. For example, a first and a second module may share hardware, software, firmware, or a combination thereof, while potentially retaining some independent hardware, software, or firmware.

Logic may be used to implement any of the functionality of the various components, such as CPU 102, processor 108, core 114, I/O controller 110, CPU memory controller 112, main memory 104, storage devices 120, storage controller 122, cache 124, data storage 126, or other components described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase "to" or "configured to," in one embodiment, refers to arranging, putting together, manufacturing, offering to sell, importing and/or designing an apparatus, hardware, logic, or element to perform a designated or determined task. In this example, an apparatus or element thereof that is not operating is still "configured to" perform a designated task if it is designed, coupled, and/or interconnected to perform the designated task. As a purely illustrative example, a logic gate may provide an output of 0 or 1 during operation. However, a logic gate that is "configured to" provide a signal to enable or disable a clock, for example, does not include every potential logic gate that may provide an output of 0 or 1. Instead, the logic gate "configured to" enable or disable the clock is one that is configured and/or coupled in some manner such that its 0 or 1 output is used to enable or disable the clock. Note once again that use of the term "configured to" does not require operation, but instead focuses on the latent state of a component (e.g., an apparatus, hardware, software, module, and/or other element), such that the component is designed to perform a particular task when the component is operating.

Furthermore, use of the phrases "capable of/to," and or "operable to," in one embodiment, refers to some apparatus, logic, hardware, and/or element designed to enable use of the apparatus, logic, hardware, and/or element in a specified manner. Note that, as above, use of "to," "capable to," or "operable to," in one embodiment, refers to the latent state of an apparatus, logic, hardware, and/or element, where the apparatus, logic, hardware, and/or element is not operating but is designed to enable use of an apparatus in a specified manner.

A value, as used herein, includes any known representation of a number, a state, a logical state, or a binary logical state. Often, the use of logic levels, logic values, or logical values is also referred to as 1's and 0's, which simply represent binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value (i.e., reset), while an updated value potentially includes a low logical value (i.e., set). Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes: random-access memory (RAM), such as static RAM (SRAM) or dynamic RAM (DRAM); ROM; magnetic or optical storage medium; flash storage devices; electrical storage devices; optical storage devices; acoustical storage devices; and other forms of storage devices for holding information received from transitory (propagated) signals (e.g., carrier waves, infrared signals, digital signals).

Instructions used to program logic to perform embodiments of the specification may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals). Accordingly, a machine-readable medium may include any type of tangible medium suitable for storing or transmitting electronic instructions or information in a form readable by a machine (e.g., a computer).

The following examples pertain to embodiments described throughout this specification.

One or more embodiments may include an apparatus comprising: a non-volatile data storage; a cache; a storage controller to: receive a request to access a first storage location of the data storage; access the cache to obtain data for one or more second storage locations of the data storage, wherein the data for the one or more second storage locations has not been written to the data storage, and wherein the first storage location and the one or more second storage locations are located near each other on the data storage; access the data storage in response to the request to access the first storage location of the data storage; and access the data storage to write the data for the one or more second storage locations obtained from the cache.

In one example embodiment of an apparatus, the storage controller is further configured to: determine that the cache does not contain data for the first storage location; determine that the cache contains the data for the one or more second storage locations; determine that the data for the one or more second storage locations has not been written to the data storage; and determine that the first storage location and the one or more second storage locations are located near each other on the data storage.

In one example embodiment of an apparatus, the data storage comprises disk-based storage.

In one example embodiment of an apparatus, the storage controller is further configured to determine that the first storage location and the one or more second storage locations are located on one or more adjacent sectors of the data storage.

In one example embodiment of an apparatus, the storage controller is further configured to determine that the one or more adjacent sectors are located on a same cylinder of the data storage.

In one example embodiment of an apparatus, the storage controller is further configured to determine that the first storage location and the one or more second storage locations can be accessed successively to reduce disk head seeking operations on the data storage.

In one example embodiment of an apparatus, the storage controller is further configured to determine that the first storage location and the one or more second storage locations correspond to adjacent physical locations on the data storage.

In one example embodiment of an apparatus, the storage controller is further configured to determine that a plurality of logical block addresses for the first storage location and the one or more second storage locations correspond to adjacent physical locations on the data storage.

In one example embodiment of an apparatus, the cache comprises random access memory.

In one example embodiment of an apparatus, the cache comprises flash-based memory.

In one example embodiment of an apparatus, the storage controller is further configured to: respond to the request to access the first storage location by obtaining data for the first storage location from the data storage; and cache the data for the first storage location.

One or more embodiments may include a method comprising: receiving a request to access a first storage location of a storage device, wherein the storage device comprises a data storage and a cache; accessing the cache to obtain data for one or more second storage locations of the storage device, wherein the data for the one or more second storage locations has not been written to the data storage, and wherein the first storage location and the one or more second storage locations are located near each other on the data storage; accessing the data storage in response to the request to access the first storage location of the storage device; and accessing the data storage to write the data for the one or more second storage locations obtained from the cache.

In one example embodiment of a method, the method further comprises determining that the cache does not contain data for the first storage location; determining that the cache contains the data for the one or more second storage locations; determining that the data for the one or more second storage locations has not been written to the data storage; and determining that the first storage location and the one or more second storage locations are located near each other on the data storage.

In one example embodiment of a method, the data storage comprises disk-based storage.

In one example embodiment of a method, the method further comprises determining that the first storage location and the one or more second storage locations are located on one or more adjacent sectors of the data storage.

In one example embodiment of a method, the method further comprises determining that the one or more adjacent sectors are located on a same cylinder of the data storage.

In one example embodiment of a method, the method further comprises determining that the first storage location and the one or more second storage locations can be accessed successively to reduce disk head seeking operations on the data storage.

In one example embodiment of a method, the method further comprises determining that the first storage location and the one or more second storage locations correspond to adjacent physical locations on the data storage.

One or more embodiments may include a system comprising: a processor; a storage device comprising: a non-volatile data storage; a cache; a storage controller to: receive a request to access a first storage location of the storage device; access the cache to obtain data for one or more second storage locations of the storage device, wherein the data for the one or more second storage locations has not been written to the data storage, and wherein the first storage location and the one or more second storage locations are located near each other on the data storage; access the data storage in response to the request to access the first storage location of the storage device; and access the data storage to write the data for the one or more second storage locations obtained from the cache.

In one example embodiment of a system, the system further comprises: a display communicatively coupled to the processor; a network interface communicatively coupled to the processor; or a battery coupled to the processor.

One or more embodiments may include at least one machine accessible storage medium having instructions stored thereon, the instructions when executed on a machine, cause the machine to: receive a request to access a first storage location of a storage device, wherein the storage device comprises a data storage and a cache; access the cache to obtain data for one or more second storage locations of the storage device, wherein the data for the one or more second storage locations has not been written to the data storage, and wherein the first storage location and the one or more second storage locations are located near each other on the data storage; access the data storage in response to the request to access the first storage location of the storage device; and access the data storage to write the data for the one or more second storage locations obtained from the cache.

Reference throughout this specification to "one embodiment" or "an embodiment" means that a particular feature, structure, or characteristic described in connection with the embodiment is included in at least one embodiment of the present specification. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the specification as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   a storage device for persistent storage of data;
   a cache for temporary storage of data;
   a storage controller to:
      receive a request to access a first storage location of the storage device;
      identify one or more second storage locations located adjacent to the first storage location on the storage device, wherein the one or more second storage locations are different than the first storage location, and wherein the cache contains data associated with the one or more second storage locations that has not been written to the storage device;
      access the cache to obtain the data associated with the one or more second storage locations of the storage device;
      access the first storage location of the storage device based on the request; and access the one or more second storage locations of the storage device to write the data obtained from the cache to the one or more second storage locations.

2. The apparatus of claim 1, wherein the storage controller to identify the one or more second storage locations located adjacent to the first storage location on the storage device is further to:
   determine that the cache does not contain data associated with the first storage location;
   determine that the cache contains the data associated with the one or more second storage locations;
   determine that the data associated with the one or more second storage locations has not been written to the storage device; and
   determine that the one or more second storage locations are located adjacent to the first storage location on the storage device.

3. The apparatus of claim 1, wherein the storage device comprises disk-based storage.

4. The apparatus of claim 3, wherein the storage controller to identify the one or more second storage locations located adjacent to the first storage location on the storage device is further to:
   determine that the first storage location and the one or more second storage locations are located on one or more adjacent sectors of the storage device.

5. The apparatus of claim 4, wherein the storage controller to determine that the first storage location and the one or more second storage locations are located on the one or more adjacent sectors of the storage device is further to:
   determine that the one or more adjacent sectors are located on a same cylinder of the storage device.

6. The apparatus of claim 3, wherein the storage controller to identify the one or more second storage locations located adjacent to the first storage location on the storage device is further to:
   determine that the first storage location and the one or more second storage locations can be accessed successively to reduce disk head seeking operations on the storage device.

7. The apparatus of claim 1, wherein the storage controller to identify the one or more second storage locations located adjacent to the first storage location on the storage device is further to:
   determine that the first storage location and the one or more second storage locations correspond to adjacent physical locations on the storage device.

8. The apparatus of claim 1, wherein the storage controller to identify the one or more second storage locations located adjacent to the first storage location on the storage device is further to:
   determine that a plurality of logical block addresses for the first storage location and the one or more second storage locations correspond to adjacent physical locations on the storage device.

9. The apparatus of claim 1, wherein the cache comprises random access memory.

10. The apparatus of claim 1, wherein the cache comprises flash-based memory.

11. The apparatus of claim 1, wherein the storage controller to access the first storage location of the storage device based on the request is further to:
    obtain data associated with the first storage location from the storage device;
    provide the data associated with the first storage location in response to the request; and
    store the data associated with the first storage location in the cache.

12. A method comprising:
    receiving a request to access a first storage location of a storage device, wherein the storage device is for persistent storage of data;
    identifying one or more second storage locations located adjacent to the first storage location on the storage device, wherein the one or more second storage locations are different than the first storage location, and wherein a cache contains data associated with the one or more second storage locations that has not been written to the storage device;
    accessing the cache to obtain the data associated with the one or more second storage locations of the storage device;
    accessing the first storage location of the storage device based on the request; and
    accessing the one or more second storage locations of the storage device to write the data obtained from the cache to the one or more second storage locations.

13. The method of claim 12, wherein identifying the one or more second storage locations located adjacent to the first storage location on the storage device comprises:
    determining that the cache does not contain data associated with the first storage location;
    determining that the cache contains the data associated with the one or more second storage locations;
    determining that the data associated with the one or more second storage locations has not been written to the storage device; and
    determining that the one or more second storage locations are located adjacent to the first storage location on the storage device.

14. The method of claim 12, wherein the storage device comprises disk-based storage.

15. The method of claim 14, wherein identifying the one or more second storage locations located adjacent to the first storage location on the storage device comprises:
    determining that the first storage location and the one or more second storage locations are located on one or more adjacent sectors of the storage device.

16. The method of claim 15, wherein determining that the first storage location and the one or more second storage locations are located on the one or more adjacent sectors of the storage device comprises:
    determining that the one or more adjacent sectors are located on a same cylinder of the storage device.

17. The method of claim 14, wherein identifying the one or more second storage locations located adjacent to the first storage location on the storage device comprises:
    determining that the first storage location and the one or more second storage locations can be accessed successively to reduce disk head seeking operations on the storage device.

18. The method of claim 12, wherein identifying the one or more second storage locations located adjacent to the first storage location on the storage device comprises:
    determining that the first storage location and the one or more second storage locations correspond to adjacent physical locations on the storage device.

19. A system comprising:
    a processor;
    a storage device comprising:
    a disk storage device for persistent storage of data;
    a cache for temporary storage of data;
    a storage controller to:

receive a request to access a first storage location of the disk storage device;

identify one or more second storage locations located adjacent to the first storage location on the disk storage device, wherein the one or more second storage locations are different than the first storage location, and wherein the cache contains data associated with the one or more second storage locations that has not been written to the disk storage device;

access the cache to obtain the data associated with the one or more second storage locations of the disk storage device;

access the first storage location of the disk storage device based on the request; and access the one or more second storage locations of the disk storage device to write the data obtained from the cache to the one or more second storage locations.

20. The system of claim 19, further comprising:

a display communicatively coupled to the processor;

a network interface communicatively coupled to the processor; or a battery coupled to the processor.

* * * * *